United States Patent [19]

Postema

[11] Patent Number: 5,579,847

[45] Date of Patent: Dec. 3, 1996

[54] AERATOR

[76] Inventor: Leonard F. Postema, 830 Ranchwood Trail, Woodstock, Ga. 30188

[21] Appl. No.: 252,244

[22] Filed: Jun. 2, 1994

[51] Int. Cl.⁶ .................................................. A01B 45/02
[52] U.S. Cl. .............................. 172/22; 172/21; 172/556
[58] Field of Search ............................. 172/21, 22, 548, 172/555, 556; 56/14.8, DIG. 9

[56] References Cited

U.S. PATENT DOCUMENTS

| | | | |
|---|---|---|---|
| 1,217,326 | 2/1917 | Meinecke | 172/556 |
| 1,288,608 | 12/1918 | Johnson | 172/548 |
| 1,744,597 | 1/1930 | Vasconellos | 172/556 |
| 2,501,364 | 3/1950 | Traver | 172/556 |
| 2,559,232 | 7/1951 | Simon | 172/556 |
| 2,580,236 | 12/1951 | Mascaro | 172/21 |
| 2,975,735 | 3/1961 | Purvance | 172/21 |
| 3,794,121 | 2/1974 | Drozak | 172/21 |
| 3,796,028 | 3/1974 | Federspiel | 56/DIG. 9 |
| 3,993,143 | 11/1976 | Moreland, Jr. | 172/22 |
| 4,020,907 | 5/1977 | Luck | 172/21 |

OTHER PUBLICATIONS

Aer–Way, "New Angle on Turf Aeration". brochure, Jan. 1985.

*Primary Examiner*—Terry Lee Melius
*Assistant Examiner*—Robert Pezzuto
*Attorney, Agent, or Firm*—Hopkins & Thomas

[57] ABSTRACT

A compact lawn aerator comprises a rigid frame having a hitch for releasibly fastening the frame to the back of a self-propelled mower. An elongated axle is secured to the under side of the frame and a set of aerator wheels are rotatably mounted at spaced intervals along the axle. Each of the aerator wheels has a generally disk-shaped hub from the periphery of which four spikes radiate. Each spike initially projects from the hub along a radius but curves along its length in the direction of rotation of the wheel. The spikes are tapered to a sharpened point and their curve is determined so that, as the wheel rotates, the ends of the spikes pierce the soil at substantially right angles and the shank of the spikes slip into the ground progressively through the pierce point. This greatly reduces the force needed to drive the spikes into the ground, thus reducing the weight and size of the device. Further, as the spikes continue to rotate out of the soil, their curved shape functions as a cupped spade that tears and pulls a soil plug from the ground, leaving a loosely packed hole through which air can freely migrate into surrounding soil. The downward force imparted by the pulling out of the soil plug helps drive the successive plug into the ground, further significantly reducing the required weight of the device.

3 Claims, 4 Drawing Sheets

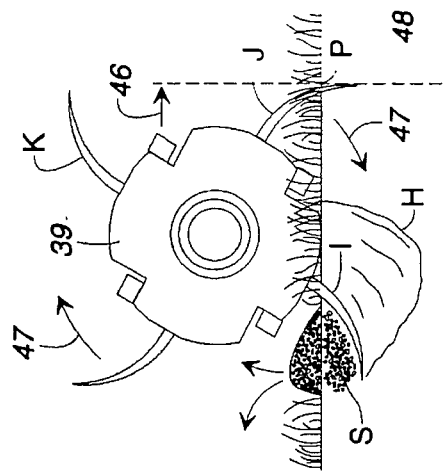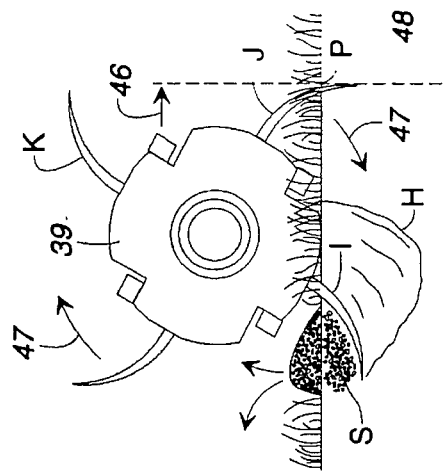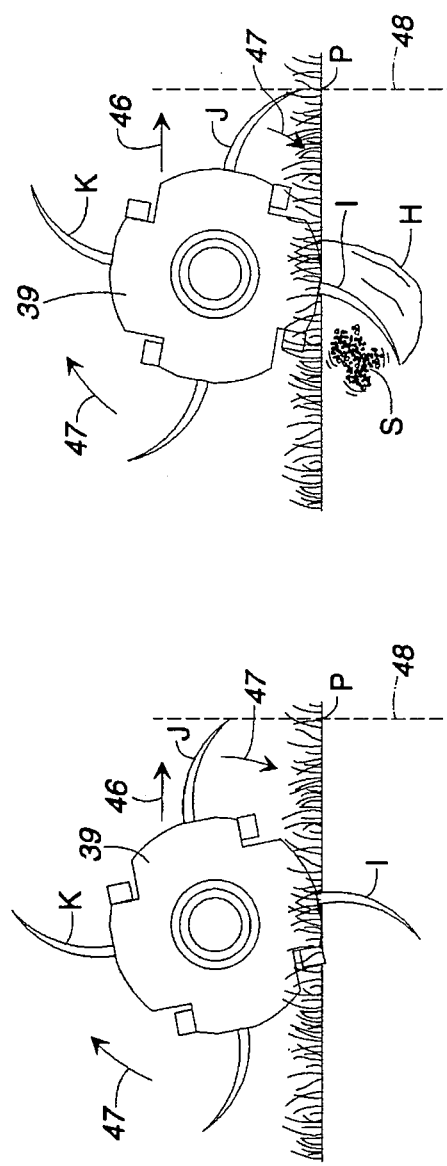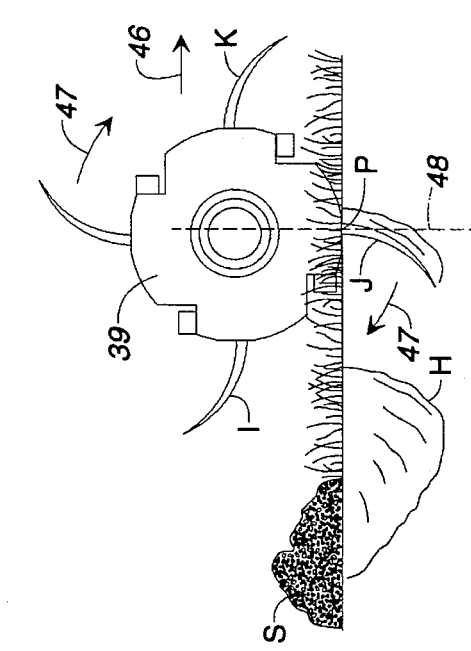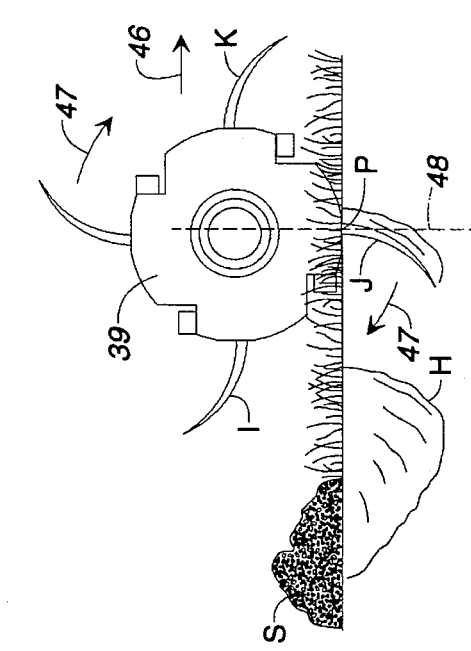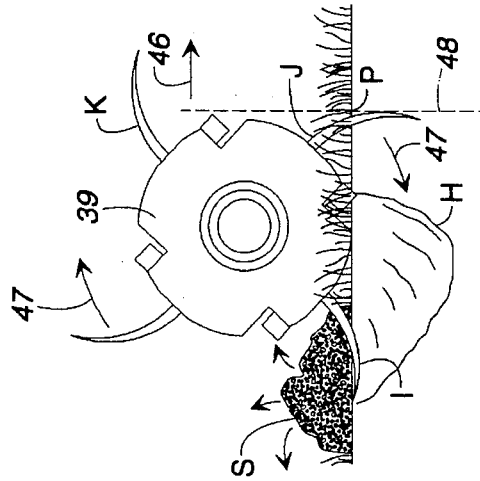

AERATOR

TECHNICAL FIELD OF THE INVENTION

This invention relates generally to lawn care and more particularly to devices for aerating the soil of a lawn to cultivate thick and healthy grass.

BACKGROUND OF THE INVENTION

Modern lawns require a great deal of care and attention in order to nurture a thick green carpet of grass. Such care includes consistent mowing, watering, and thatching as well as periodic overseeding and fertilization. In addition, it is imperative that a healthy lawn be aerated at least twice a year and, preferably, even more often. Aeration usually entails creating a multitude of closely spaced small holes in the surface of the ground to permit air and oxygen to be absorbed into the soil. The holes also tend to increase moisture penetration into the soil and serve as receptacles for grass seed to prevent the seed from being washed away and to promote germination and growth.

Numerous lawn aeration devices have been available. One such device comprises a large cylindrical drum studded about its periphery with a plurality of short radially extending spikes. The drum is rolled or pulled over the ground and, as it rolls, the spikes are driven into the soil to create shallow holes. While this device is widely used and has proven somewhat successful, it is nevertheless plagued with numerous problems and shortcomings inherent in its design. For example, since the spikes necessarily engage the ground at an angle and are rotated laterally through the soil, significant force is required to penetrate the ground and move the spikes through the dirt. As a result, the drums of these devices generally are relatively large and usually are filled with water or sand or have large cement blocks or other weights to provide sufficient weight to drive the spikes into and through the soil. In addition, the density of spikes on the drum and thus the density of holes the aerator can make in the soil is severely limited since the weight of the device is inherently inadequate to drive more than a few of the spikes at a time into and through the soil. Finally, as each of the spikes of this device is forcibly driven into the soil, it pushes aside the dirt to make room for the spike. This is the action that actually creates the hole; however, it also necessarily compacts and hardens the soil all around the sides of the hole. As a result, penetration of air from within the hole into surrounding soil is reduced as is the penetration of moisture. Consequently, the efficiency and advantages of the aeration are reduced.

Another lawn aeration device seeks to address the soil compaction problems of drum and spike aerators by providing hollow spikes that actually pierce the ground and remove a plug of soil to create a hole. During each penetration of the ground, another soil plug is forced upwardly through the hollow spike and the plugs are simply ejected from the spike at its upper extent. While these types of devices, commonly known as pluggers, tend to reduce the compaction of soil around the sides of the holes, they nevertheless do not eliminate it, This is because the soil must still be parted to accommodate the thickness of the walls of the hollow spikes as they pierce the soil. In addition, such hollow spike aerators still require significant force to drive them into and through the soil and thus still require large heavy and cumbersome structures for proper operation. This is because sliding friction of the soil plug through hole in the spike is relatively high requiring extra force to drive plug through the soil.

Slicer styled aerators also exist. These aerators generally have thin star shaped blades that rotate over the ground to slice a narrow furrow or slot in the soil. Such aerators have many of the same problems as other types of aerators and also create furrows that tend to close up quickly when stepped upon. Further, the slots are so narrow that seeds and fertilizer cannot easily get into the narrow slot and its water retention is very small.

Because of their weight, many lawn aerators are motorized. This not only makes them expensive but also renders them difficult to use. When the heavy spiked drums are driven over the ground by their motors, they naturally bump, bounce, and shake about as the spikes are driven into and through the soil. This can create significant fatigue for users of these aerators. Further, the unitary drum construction of these devices renders them very difficult to turn at the end of an aerating run and the drum often must be manually scraped about in an arc to achieve the turn. This is not only cumbersome, it also tends to destroy healthy grass already growing in the lawn and can create an unsightly mess, particularly in moist or wet soil.

Thus, there exists a need for a simple compact aerator that is light, small, and easily pulled or pushed manually across the ground. Such an aerator should require minimum force for piercing and aerating the soil, thus eliminating the need for heavy drums and the like. The spikes of the aerator should be designed to eliminate the compaction of soil common with prior art devices and, in fact, should insure that the soil is actually loosened in the vicinity of each hole to insure maximum aeration and moisture penetration. The device should be easy to use by the common homeowner, inexpensive to purchase, and sufficiently small, light, and easy to roll that it can be attached and pulled behind a standard walk behind awn mower so that a lawn can be aerated as it is mowed. It is to the provision of such a lawn aerator that the present invention is primarily directed.

SUMMARY OF THE INVENTION

Briefly described, the present invention, in one preferred embodiment thereof, is an improved lawn aerator that is small, lightweight, and pullable behind a standard walk behind or self propelled mower to aerate a lawn as the lawn is mowed. The aerator comprises a frame having a tongue that can be attached to the back of a mower for pulling or can be attached to a handle for manual operation. An axle is mounted to the bottom of the frame and a set of aerator wheels are mounted at spaced intervals along the axle. Each of the aerator wheels has a disc-shaped hub from which a set of four curved spikes outwardly extend. The aerator wheels are oriented to roll across the ground. The spikes initially project from their hubs along a radius but have shanks that are curved generally in the direction of rotation of the wheels. Each of the spikes is tapered to a relatively sharpened ground piercing end.

In the ideal embodiment, the curve of each spike is critically determined to insure that the sharpened end of the spike engages and pierces the surface of the soil at a substantially right angle as the aerator wheel rolls across the ground. The curve further insures that, as the aerator wheel continues to roll, the shank of the curved spike which is shaped like a flat knife-like blade or tine, progressively follows the end of the spike into the soil through the opening initially formed by the sharpened end. Accordingly, as the aerator wheel rolls across the ground, each of its spikes in turn pierces the soil like the tip end of a knife and slices cleanly through the pierce point until the spike is fully submerged in the soil, which occurs when the center of the wheel is aligned with the pierce point on the ground.

As the wheel continues to roll past the pierce point, the curved spike begins to be rotated back up out of the ground on the trailing side of the wheel. Since it is moving in the direction of its curve, the spike functions as a cup-shaped spade that loosens, pulls, and lifts a loose clump of soil from the ground leaving a small hole. The loose clump of dirt removed from the hole is simply tossed aside on the surface leaving behind porous loose dirt on the walls of the hole. This loose dirt allows air and oxygen to penetrate freely through the walls of the hole and into the surrounding soil resulting in greatly improved oxygenization of the soil over prior art aerators, which, as discussed above, tend to leave holes with compacted soil sides. Further, since a loose clump of soil is lifted and laid on the ground, the clump tends to break up and disburse more readily than the hard dowel-like plugs produced by prior art aerators.

In addition to the forgoing advantages of easy penetration and the creation of porous hole sides that enhance aeration, the present invention also addresses the bulk and weight problems associated with prior art aerators. First, as discussed above, the curved spikes are formed to insure that their sharpened ends pierce the ground cleanly and easily and that their shanks slip into the soil substantially through the pierce point as the wheels rotate. This alone greatly reduces the force required to drive the spikes into the ground such that only a fraction of the weight required to drive in the spikes of prior art devices is needed. In addition to this, however, the spikes are positioned about their hubs so that one spike is being rotated out of the ground and, in the process, dislodging and pulling a plug of dirt from the soil as the next successive spike is piercing and slipping into the soil. The dislodging and pulling of the soil creates significant downward force on the aerator wheel. This force, in turn, is transferred to the piercing spike helping to drive it into the soil. It will thus be seen that the action of the spikes being extracted from the soil as the aerator wheels roll provides a significant portion of the downward force needed to drive successive spikes into the soil. As a matter of fact, the device of this invention virtually grips and digs into the soil like the talons of a hawk under the influence of its own action. As a result, an even further significant reduction in the extra unit weight needed to drive the spikes into the soil is realized.

The configuration and operation of the aerator wheels and spikes of this invention allows, for the first time, a practical lawn aerator that can be made small, light, and economical enough to become a common tool of the homeowner that can simply be hitched to a standard push mower and towed as a lawn is mowed. In such a configuration, the mower cuts the grass and the aerator follows behind to aerate the soil. A handle can also be attached as an alternative to towing for manual operation of the aerator alone. Numerous configurations of the invention are possible, including large commercial versions for golf courses and the like and small hand versions for aerating a flower bed or herb garden. All of these as well as other objects, features, and advantages of this invention will become more apparent upon review of the detailed description set forth below when taken in conjunction with the accompanying drawings, which are briefly described as follows.

BRIEF DESCRIPTION OF THE DRAWINGS

FIGS. 3A–3F show sequentially the operation of the wheels and curved aerator spikes of the present invention as the device is pulled or pushed across the ground.

DETAILED DESCRIPTION OF THE PREFERRED EMBODIMENT

Figure 1:
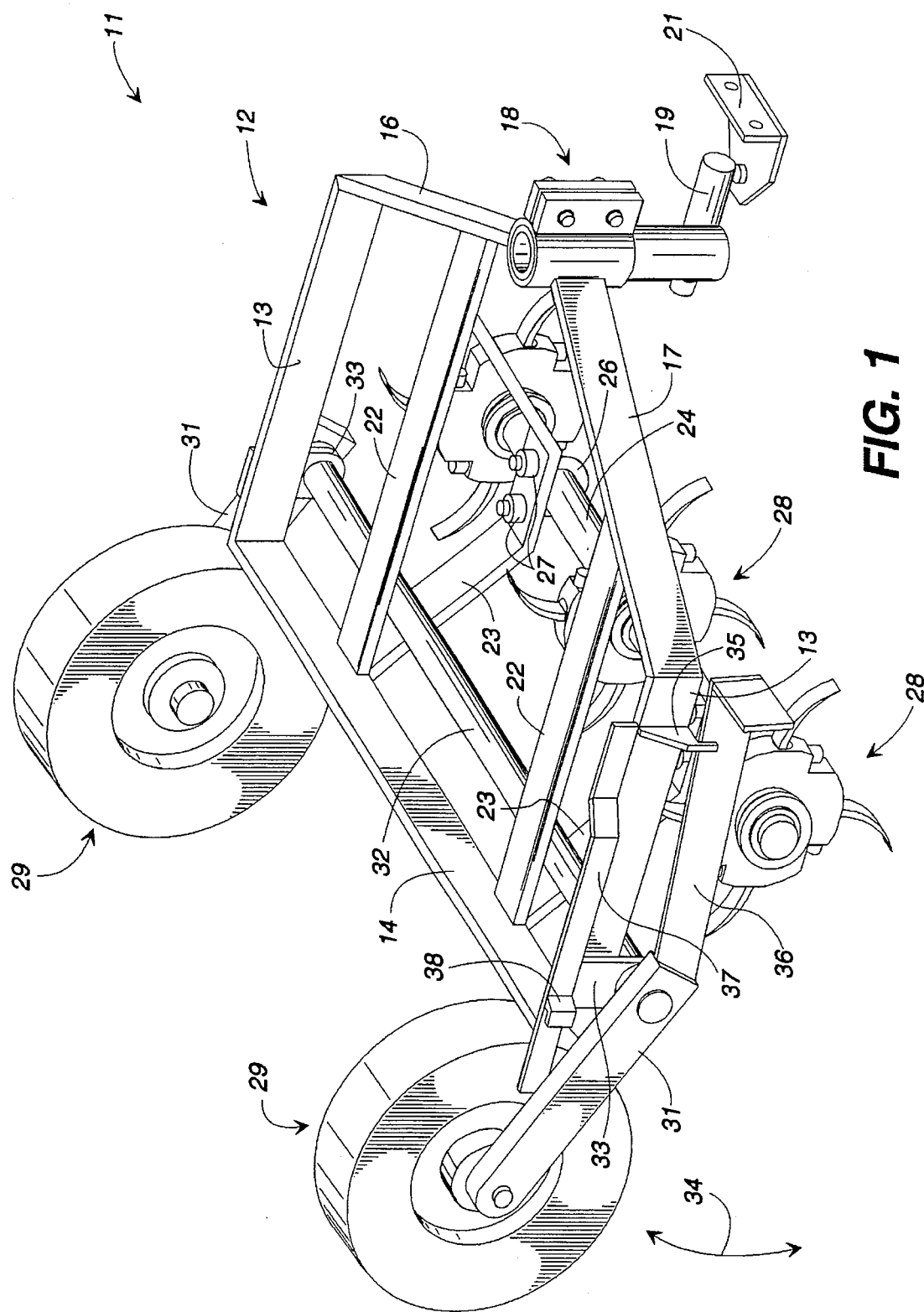
FIG. 1 is and overhead perspective view of a lawn aerator that embodies principles of the present invention in a preferred form.
Figure 2:
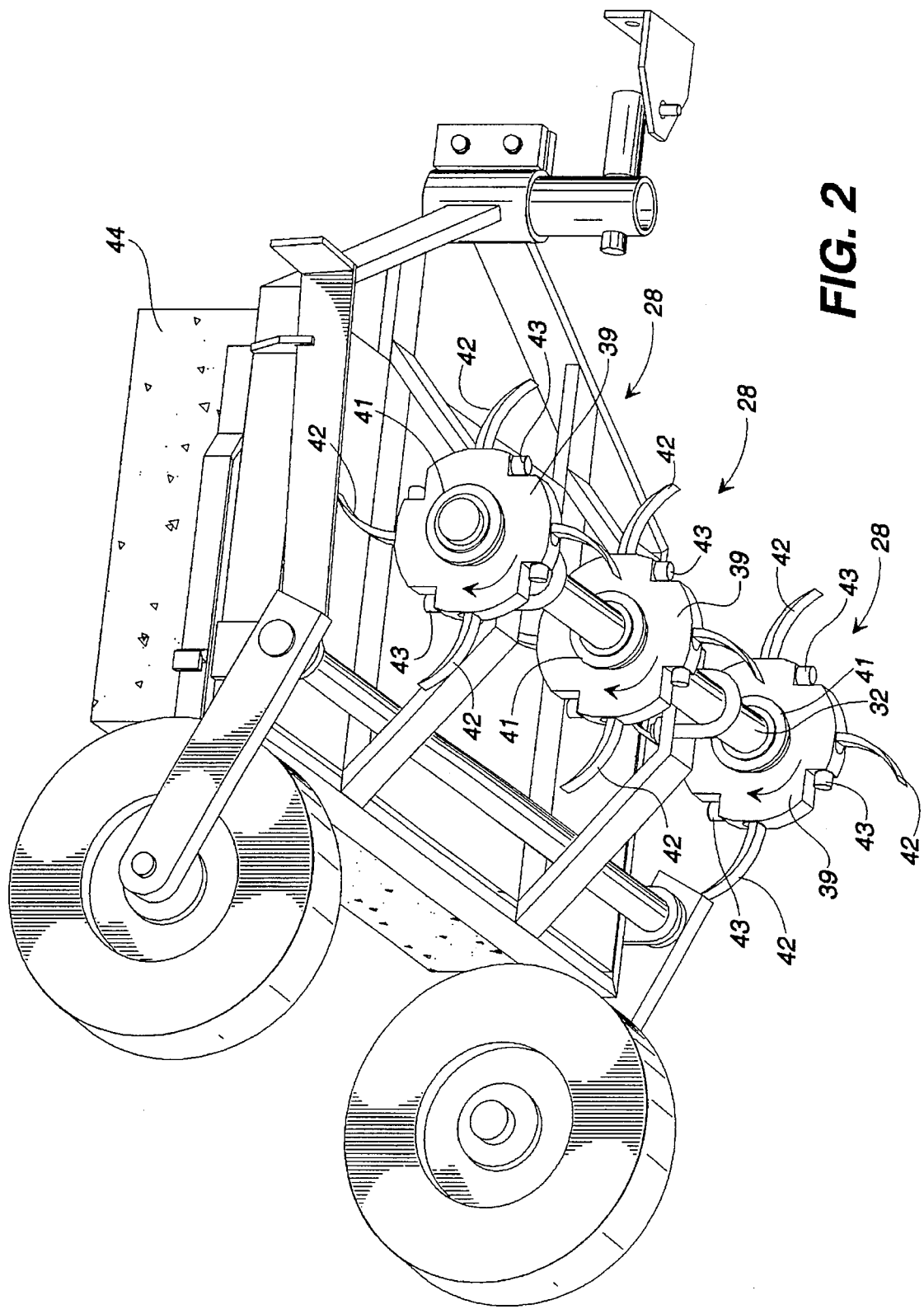
FIG. 2 is a perspective view of the lawn aerator of FIG. 1 as seen from the bottom side thereof and illustrating the spiked aerator wheels of the device.

Referring now in more detail to the drawings in which like numerals refer to like parts throughout the several views, FIGS. 1 and 2 illustrate a compact aerator that embodies principals of the present invention in a preferred form. The aerator 11 comprises a metal frame 12 formed of side bars 13, a back bar 14, and angled front bars 16 and 17. The front bars 16 and 17 terminate in a tongue assembly 18. The tongue assembly 18 includes a coupler 19 adapted to couple to a hitch 21. The hitch 21, in turn, is adapted to be mounted on the back panel of a standard or self-propelled walk behind mower, garden tractor, or other appropriate lawn vehicle for pulling the aerator of the present invention.

A pair of support bars 22 extend between the rear bar 14 and respective ones of the front bars 16 and 17 and are firmly welded or otherwise affixed thereto. A pair of axle mounting brackets 23 are fixed to the underside of the frame 12 and extend downwardly therefrom. More specifically, each of the brackets 23 is welded to the rear bar 14 at one end and is welded to a respective one of the support bars 22 adjacent the front portion of the frame 12. An elongated axle 24 is secured to the bottoms of the axle mounting brackets by a pair of U-bolts 26 and associated nuts 27. The axle 24 extends across the width of the frame 12 approximately in the center portion thereof. A set of aerator wheels 28 each having a hub 39 and curved spikes 42 are rotatably mounted at spaced intervals along the length of the axle 24. The details of the aerator wheel construction and operation will be described in more detail herein below.

A pair of rollers 29 are each rotatably secured to the end of a pivot arm 31. The pivot arms 31 are welded or otherwise fixed to the ends of a pivot axle 32 that is rotatably journaled within a pair of spaced bearing brackets 33 that are fixed to the side bars 13. With this arrangement, the rollers 29 can be pivoted on their pivot arms 31 in the directions indicated by arrow 34 between a raised position as shown in FIGS. 1 and 2 and a lowered position (not shown) wherein the pivot arms 31 extend downwardly from the frame. This last position of the rollers 29 provides for easy transportation of the aerator 11 to and from storage sites and to and from areas that are to be aerated. A handle 36 is fixed to one of the pivot bars 31 for manually raising and lowering the rollers 29. A latch 35 is provided on the frame 12 for locking the handle 36 in its down position and thus locking the wheels 29 in their up positions. Similarly, a spring bar 37 and associated latch 38 are provided for releasably locking the handle 36 in its up position and thus the rollers in their down positions.

As best seen in FIG. 2, each of the aerator wheels 28 comprises a generally disc-shaped central hub 39 that is rotatably journaled on the axle 24 by means of appropriate bearings 41. Extending outwardly from each of the hubs 39 is a set of four aerator spikes 42, which actually pierce and penetrate the ground to achieve aeration. A set of four equally spaced radial holes is drilled through the edge of each hub 39 and one of the spikes 32 is releasably secured in each hole by means of a corresponding set screw 43.

Each of the aerator spikes 42 initially extends from its hub 39 along a radius thereof but immediately begins to curve generally in the direction of rotation of the hub. In addition, each of the spikes is tapered to a relatively sharp point at its free end. As discussed in more detail below, in the ideal embodiment the curve of each spike 42 is critically determined so that as the aerator wheels 28 rotate in the directions indicated by arrows in FIG. 2, each spike pierces the ground at its sharpened end whereupon the shank of the spike progressively follows the end into the ground through the initial pierce point. This configuration greatly reduces the force needed to drive the spikes into the ground and thus reduces significantly the size, bulk, and weight of the aeration device. As a matter of fact, it has been found that a simple four inch cement block 44 (FIG. 2) nestled within the cradle formed by the frame and its support bars provides more than sufficient weight to drive the spikes of all three aerator wheels cleanly and smoothly into the ground.

FIGS. 3A–3F illustrate the sequential operation of each aerator wheel as it moves across the surface of the ground. In these illustrations, the wheels are seen to be moving across the ground in the direction of arrows 46 and rotating in the direction of arrows 47. Throughout these illustrations, dashed line 48 is positioned at a substantially fixed point on the ground to illustrate relative motions of the components of the wheel. In addition, the designations I, J, and K indicate three of the aerator spikes on the wheel as it moves across the ground.

In FIG. 3A, aerator spike I is seen to be inserted almost fully into the ground beneath the rolling hub 39. The tip of aerator spike J is poised above the ground in position for penetration at point P. In FIG. 3B, the hub 39 has rotated in the direction 47 and translated across the ground in direction 46 until the point of aerator spike J has engaged the ground at point P. At the same time, aerator spike I has begun to be rotated up behind the hub 39 and out of the ground. As spike I moves in this fashion, its curved shape functions as a spade that begins to dig and pull a clump of soil S from the ground. In its wake, the aerator spike I begins to leave a hole H in the ground. It will be understood that since the aerator spike I is shoveling the clump of dirt S from the hole H and moving it up out of the hole, the sides of the holes will naturally be comprised of loose dirt and soil from which the clump S has been broken and pulled away.

In FIG. 3C, the hub 39 has been rotated a bit further. It is seen from this figure that the sharpened tip of the aerator spike J has pierced the surface of the ground at point P and is being driven by the motion of the aerator wheel deeper into the soil. The curve of spike J, and all of the spikes for that matter, is predetermined so that as the hub 39 moves in direction 46 across the ground, the shank of spike J progressively slips into the ground through the original puncture point P made by the tip of the spike. Thus, the spike is not moved laterally across its length through the soil as with spikes on prior art devices but rather is slipped slowly and cleanly into the ground in a fashion reminiscent of a knife being stuck into the soil. This configuration of the spikes and their resulting functionality reduces by a great amount the force required to drive the spike J into the soil. In fact, this force has been found to be very small indeed when the spikes are appropriately sharpened and the ground is of average compaction.

At the same time that spike J is being driven progressively into the ground through point P, spike I which previously was driven into the ground, begins to move further out of the ground shoveling the small clump of soil S along with it as it goes. As the spike I shovels out the clump of soil S, a corresponding downward force equal to the force required to break out the clump of soil, pull and break away any roots, and extract the clump from the ground is imparted to the hub 39. This force, in turn, is transferred to the entering spike J. As a result, the shoveling action of spike I actually provides some of the downward force necessary to drive the next succeeding spike J into the ground behind spike I. In practice, it has been found that this shoveling action indeed provides a significant fraction of the necessary force for driving successive spikes into the ground. In fact, as the device of this invention is pushed or pulled across the ground, its spikes tend to grab and grip the ground like the talons of a hawk and hug the ground closely as the device is moved across the surface. In FIG. 3C, the clump of soil S is beginning to be dislodged and broken away from the soil and is being carried above the surface of the ground.

In FIG. 3D, the hub 39 has rotated a bit further and the aerator wheel has moved laterally in the direction 46. The aerator spike J has slipped further into the ground through puncture point P and aerator spike I has almost been completely extracted from the ground, carrying with it the clump of soil S and leaving behind it the ragged hole H.

In FIG. 3E, spike I has been rotated completely out of the ground and the center of the hub 39 is aligned over the puncture point P on the ground. At this point, the spike J is completely inserted into the ground beneath the hub 39 and is just beginning to be rotated up out of the ground behind the moving hub. In the meantime, the prior action of spike I has left a hole H in the ground and the clump of soil S that was removed from the hole has been laid atop the ground. It can be seen that the aerator of this invention allows for closely spaced aeration holes, which are highly desirable for proper soil aeration.

In FIG. 3F, the hub 39 has been moved across the ground in direction 46 until spike K has engaged the surface of the ground and is beginning to be pushed into the soil. Spike J is now moving up around behind the hub 39, bringing with it a clump of soil S and leaving behind it a hole H as did spike I in the previous cycle. Thus, in FIGS. 3A–3F, the aerator wheel is shown to complete a cycle and begin another cycle. It will be appreciated that as the wheel moves across the ground, it leaves behind it a series of spaced rough-edged holes from which dirt has been removed and deposited onto the ground.

Figure 4:
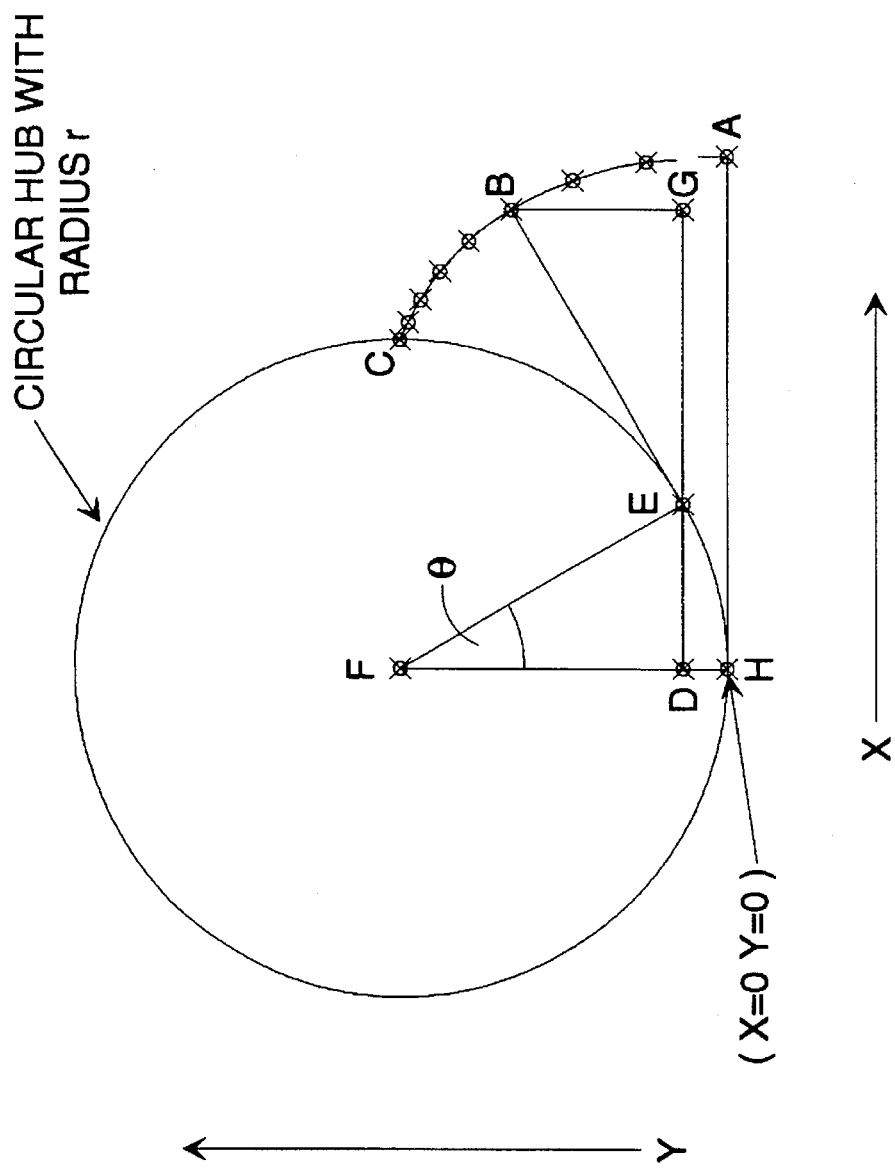
FIG. 4 illustrates the empirical determination of the spike shape for the ideal embodiment thereof.

The ideal curve of the spikes as illustrated in FIGS. 3A through 3F can be determined empirically through the following mathematical solution. The solution yields a formula to determine the X and Y coordinates of a point B, which lies along the inside edge of a curved spike meeting the conditions described above. The point B is the point on the spike that enters the ground through point A when the hub is rolled through a corresponding arbitrary angle θ in the x direction. In the cartesian coordinate system in which the solution is presented, the X axis is horizontal, the Y axis is vertical, and the point X=0, Y=0 coincides with point H directly below the center of a circular hub. Point C has coordinates X=r, Y=r when the hub is in its initial position as shown in FIG. 4, where r is the radius of the hub.

From geometry and trigonometry, we know that the following relationships are true:

$$EH = \frac{\pi r \theta}{180}$$

-continued
$$CH = \frac{\pi r}{2}$$

$ED = r\sin\theta$ $EB = AH - EH$ $EG = \cos(\theta) \times EB$ $BG = \sin(\theta) \times EB$ and $DH = FH - (\cos(\theta) \times FH)$ We also know that the X and Y coordinates of point B are:

$X = EG + ED$ $Y = BG + DH$

By substitution, we have the following final equations:

$$X = \left(\cos(\theta) \times \left(\frac{\pi r}{2} - \left(\frac{\pi r\theta}{180}\right)\right)\right) + (\sin(\theta) \times FH)$$

$$Y = \left(\sin(\theta) \times \left(\frac{\pi r}{2} - \left(\frac{\pi r\theta}{180}\right)\right)\right) + (FH - (\cos(\theta) \times FH))$$

In order to determine a set of X,Y points that define the desired curve, one need only select a radius r for the hub and solve the above equations for a plurality of θ's between 0 and degrees, The result is a set of points B that define the curve AC depicted in FIG. 4.

The invention has thus far been described in terms of the ideal shape of the spikes to insure that each spike pierces the ground normal to its surface and slices into the soil through a single point. While this configuration has indeed been found to be ideal and preferred for aerator hubs that are driven to pull themselves across the ground, a slightly modified variant is preferred for an aerator that is pulled or pushed across the ground. In this later situation, the spikes can tend to ride up and walk over the surface of the ground, particularly in dense or hard soil. In addition, the ideal spike as determined from the above equations inherently limits the depth to which the spike can penetrate for a hub of a given radius.

To address these problems for pushed or pulled aerators, it has been found advantageous to rotate the curved spikes slightly outwardly from their ideal positions. With this modification, the spikes extend further outwardly from the hub and thus can penetrate the ground further to create deeper aeration holes. In addition, the modified spikes do not pierce the ground vertically but rather at a slight acute angle. This configuration in conjunction with the forwardly and downwardly directed composite force imparted by the vector sum of gravity and the pulling force eases penetration and prevents the spikes from "walking" on top of the ground. An additional advantage is that the modified spikes do not slice into the soil through precisely one point but rather tend to pierce at a point and then move slightly rearwardly toward the hub as the hub rolls. This insures that there is no compacting of the soil in front of the path of the spike and thus insures that the resulting aeration hole has loose dirt sides all around for maximum aeration.

Accordingly, the present invention should not be interpreted as being limited by the illustrated embodiment exhibiting the ideal shaped spike. Rather, the invention contemplates and encompasses the above described and other variations of the ideal embodiment with the ideal spike shape representing only a preferred starting place.

With the just described mechanism, it has been found that effective and efficient aeration can be accomplished with a mechanism that is substantially smaller and many times lighter than prior art aeration devices. In addition, the apparatus of this invention can be made inexpensively so that the average home owner can afford one and use it periodically to aerate his lawn. When not in use, the apparatus is light enough simply to be hung on a wall. During use, it can be hitched to the back panel of a standard walk behind mower, riding mower, or other lawn implement and pulled along behind. As an additional advantage, the present invention provides aeration holes that are superior to those provided by prior art devices. This is because the dirt is pulled out of the holes rather than compacted against the sides of the holes. As a result, the sides of the holes comprise loose dirt through which moisture and oxygen can freely migrate into surrounding soil. Thus, the present invention represents a significant advance in the lawn-care art in a number of critical aspects.

The invention has been described herein in terms of preferred embodiments and methodologies. It will be obvious to those of skill in this art, however, that various modifications might well be made to the illustrated embodiments within the scope of the invention. For example, while the aerator wheels have been shown with four spikes, fewer or more than four might also be employed. In addition, the aerator wheels themselves might well be simply molded from a single piece of metal rather than formed of a hub with detachable spikes. The invention has been illustrated in terms of a multi-wheel pull-along device for use with lawn mowers. However, single wheel, hand-held aerators for use with small flower gardens or herb gardens might also be employed within the scope of this invention. On the other side of the spectrum, large commercial versions of the aerator might also be produced to aerate golf courses, farms, and other large plots of land. These and many other possible additions, deletions, and modifications are possible and may be made to the illustrated embodiments without departing from the spirit and scope of this invention as set forth in the claims.

I claim:

1. An aerator wheel assembly for use in a soil aerator to pierce the soil and remove loose clumps of dirt therefrom to aerate the soil as the aerator moves across the ground, said aerator wheel assembly comprising:

a hub having opposed faces and a peripheral edge, said hub being adapted to be rotatably journalled on an appropriate axle for rotation of said hub about the axle substantially in a direction of movement of the aerator across the ground;

a set of aerator spikes projecting from said peripheral edge of said hub to respective free end;

each of said spikes being curved generally in the direction of rotation of said hub the curve of each of said aerator spikes being substantially determined through application of the following equations:

$$X = \left(\cos(\theta) \times \left(\frac{\pi r}{2} - \left(\frac{\pi r\theta}{180}\right)\right)\right) + (\sin(\theta) \times FH)$$

$$Y = \left(\sin(\theta) \times \left(\frac{\pi r}{2} - \left(\frac{\pi r\theta}{180}\right)\right)\right) + (FH - (\cos(\theta) \times FH))$$

where X and Y are coordinates of a point that lies along the curved spike, θ is an arbitrary angle through which the hub is rotated, r is the radius of the hub, and FH is the length of a line from the center of the hub to its tangent point with the ground when θ=0.

2. An aerator wheel assembly as claimed in claim 1 and wherein each of said spikes is rotated outwardly a predetermined amount from the shape determined through application of said equation.

3. A lawn aerator comprising a frame adapted to be moved across a lawn to be aerated and at least one aerator wheel assembly mounted to said frame for aerating the soil as said frame is moved across the lawn said aerator wheel assembly comprising a hub mounted for rotation substantially in the direction of motion of said frame and a set of aerator spikes projecting from said hub substantially in the plane of rotation thereof to free ends, each spike being curved in the direction of rotation of said hub and being sized and positioned so that, as the lawn aerator moves across the ground, the free end of each spike pierces the soil substantially at the same time the immediately preceding spike is fully emerged in the soil, the curve of each spike being the result of rotating the spike outwardly a predetermined amount from a curve determined through application of the following equations:

$$X = \left( \cos(\theta) \times \left( \frac{\pi r}{2} - \left( \frac{\pi r \theta}{180} \right) \right) \right) + (\sin(\theta) \times FH)$$

$$Y = \left( \sin(\theta) \times \left( \frac{\pi r}{2} - \left( \frac{\pi r \theta}{180} \right) \right) \right) + (FH - (\cos(\theta) \times FH))$$

where X and Y are coordinates of a point that lies along the curved spike, θ is an arbitrary angle through which the hub is rotated in the x direction, r is the radius of the hub, and FH is the length of a line from the center of the hub to its tangent point with the ground when θ=0.

* * * * *